Nov. 21, 1972     W. J. HANNAN ET AL     3,703,407
RELIEF PHASE HOLOGRAMS
Filed Dec. 15, 1970
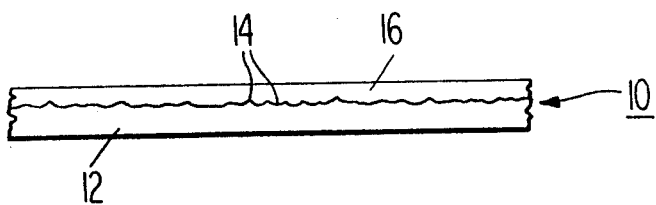
INVENTORS
Arthur H. Firester,
William J. Hannan and
John P. Russell.
BY
ATTORNEY 3,703,407
RELIEF PHASE HOLOGRAMS
William James Hannan and John Patrick Russell, Pennington, and Arthur Herbert Firester, Skillman, N.J., assignors to RCA Corporation
Filed Dec. 15, 1970, Ser. No. 98,302
Int. Cl. G02b 27/22; G03c 5/22
U.S. Cl. 117—138.8 UA            4 Claims

ABSTRACT OF THE DISCLOSURE

An improved relief phase hologram is described which minimizes signal distortion upon playback. The hologram comprises a holographic relief pattern embossed on a polymeric substrate such as a vinyl tape and a coating on the surface of the substrate directly over the relief pattern. The coating must have a thickness of somewhat greater than the maximum contour depth of the relief pattern and must be of a material having an index of refraction which is different from that of the substrate.

BACKGROUND OF THE INVENTION

This invention relates to improved information storage media containing embossed holographic relief patterns on a surface thereof and more particularly to a flexible tape containing embossed holographic information thereon which is useful for video playback recording.

Embossed hologram motion pictures for television playback are known in the art and are described in an article by Bartolini, Hannan, Karlsons, and Lurie in Applied Optics, vol. 9, No. 10, October 1970 at pages 2283 through 2290. Techniques for recording, replicating and reconstructing relief phase holograms are described in that article. Generally, replication is accomplished by first producing the relief pattern by usual holographic techniques onto a photoresist. A metal master is formed so as to replicate this relief pattern (actually a negative of the relief pattern is formed) by means of electroless and electroplating techniques. The original relief pattern is then formed on a flexible, preferably transparent, tape typically vinyl, by means of embossing the master into the transparent tape. The embossed vinyl tape provides a low cost medium for recorded information and is many times less expensive than prerecorded magentic video tape or photographic film.

There are two important classifications of holograms, redundant holograms and non-redundant holograms. In the case of the redundant holograms, the object information is spread out and repeated over the hologram area. This redundancy gives, on playback, considerable immunity to image noise due to the presence of scratches, dust and dirt on the hologram. In the case of a non-redundant hologram, the information is localized and non-repetitive and scratches, dust and dirt mar the image as seen on playback.

The surface of embossed holographic tapes are subject to a great deal of scratching especially due to running the tape through a tape transport system for video playback. Where the recorded information contains a low redundacy or no redundancy the effect of the scratches, dust and dirt are severe and must be minimized or substantially eliminated in order to produce a commercially useful product.

SUMMARY OF THE INVENTION

A substrate having a holographic relief pattern on one surface thereof contains a coating of a second material over the holographic relief pattern, said coating having a minimum thickness which is greater than the maximum depth of any contour of the relief pattern so as to completely fill the valleys of said relief pattern. The coating must have an index of refraction which is different from that of the said substrate material containing the relief pattern.

BRIEF DESCRIPTION OF THE DRAWINGS

The figure is a side cross-sectional view of a portion of a tape containing an embossed holographic relief pattern thereon.

DETAILED DESCRIPTION OF THE PREFERRED EMBODIMENTS

Referring to the figure there is shown a side elevational view of a portion of an elongated tape 10 containing holographic information thereon. The tape 10 comprises a thermoplastic vinyl substrate material 12 having a holographic relief pattern 14 embossed on a surface thereof. The substrate 12 may either be transparent or opaque. The holographic relief pattern 14 consists of surface corrugations which diffract light to form the desired image. These corrugations are generally only in the order of about one-tenth of a micron in depth from peak to valley when the tape is not coated as taught by the present invention. The novel tape 10, however, is provided with a coating 16 upon the holographic relief pattern which completely fills the corrugations. In order to maintain the same diffraction efficiency as an uncoated tape, the depth ($d$) of the corrugations should be maintained in accordance with formula $$(n_1-1)d_{air}=|(n_1-n_2)d_{coated}|$$

wherein $n_1$ is the refractive index of the substrate, $n_2$ the refractive index of the coating, $d_{air}$ the corrugation depth without a coating and $d_{coated}$ the corrugation depth when coated. The minimum depth of this coating must be greater than the maximum peak-to-valley depth of any corrugation. The coating material 16 should be relatively transparent to the light used for playing back the hologram and flexible in the thickness employed and most important it must have an index of refraction which is different from that of the substrate material 12 having the embossed holographic relief pattern 14 thereon. For practical purposes it is preferred that the total tape thickness be in the order of 1 to 2 mils and should not exceed about 6 mils and that the coating be in the order of about 0.1 to 1 mil in thickness. Due to the generally much larger thickness of the coating in comparison to the corrugation depth of the holographic relief pattern, the coating generally has a smooth surface. Where the coating surface reproduces the corrugations of the relief pattern, any slight interference which may appear from this surface could be substantially eliminated by providing playback optics such that the coating surface is outside the depth of the focal plane of lens used for reading the hologram.

The greater the difference between the index of refraction of the coating as compared with the index of refraction of the substrate material the greater will be the intensity of the holographic image upon playback. If the index of refraction of the coating and the substrate material were the same or nearly the same, the light would essentially pass through the tape without being diffracted in accordance with the relief pattern and hence an image would not be reformed on playback. A refractive index difference between substrate and coating of at least 0.1 is preferred, but not essential.

The presence of the novel coating on the holographic tape provides improved scratch resistance of the holographic tape and minimizes image distortion or image noise due to such scratches upon playback. Where in-focus holography is employed, the scratches on the coating are not in focus with the holographic image and therefore tend to be washed out. In addition, the coating enables tapes to be lubricated and enables tapes to be used in a liquid gate tape transport mechanism. Tapes without the coating could not be lubricated nor used with a liquid gate transport mechanism and still provide a commercially acceptable image on playback.

The preferred substrate material for the tape is a transparent thermoplastic vinyl having an index of refraction of about 1.5. Materials useful for coating the vinyl include, for example, waxes, polymers and inorganic compounds. The table below gives some examples of materials useful as a coating over a vinyl polymer having an index of refraction of about 1.5.

| Name: | Refractive index |
|---|---|
| Styrax [1] | 1.62 |
| Halowax [2] | 1.635 |
| Aroclor [3] | 1.637 |
| Hyrex [4] | 1.7 |
| Arsenic sulphide | 2.6 |
| Polystyrene | 1.6 |
| Polyvinylcarbazole | 1.68 |
| Silicone [5] | 1.4 |

[1] An aromatic balsam resin obtained from the bark of the tree *Liquidambar orientalis* and which contains 33–50% α- and β-storesin and cinnamic ester, 5–10% styracin, 10% of phenyl-propyl cinnamate, 5–15% free cinnamic acid, 0.4% $C_{10}H_8O$ oil, small amounts of ethyl cinnamate, benzyl cinnamate and styrene and a trace of vanillin.
[2] A series of chlorinated hydrocarbon waxes available from Koppers Company.
[3] A series of chlorinated hydrocarbon waxes available from Monsanto Chemical Company.
[4] A non-crystalline, high melting wood resin available from Newport Industries, Inc.
[5] A series of compounds having the general formula $R_nSiO_{(4-n/2)m}$ wherein R is alkyl, generally methyl, n is an integer of 0–3 and m is an integer of at least 2.

The coatings may be formed on the substrate by any number of known techniques, such as casting, melting, vacuum evaporating, vaporization and spray or roller coating. The particular method used depends upon the particular coating selected and the substrate material. Where casting from a solvent solution is the method employed, the solvent for the coating must not affect the substrate having the hologram thereon.

Where the substrate is in the form of a non-flexible element, such as a disk, the coating need not be flexible, and inorganic coatings such as $MnF_2$, LiF, SiO are useful and will provide an abrasion resistant surface.

What is claimed is:

1. An information storage media comprising a substrate having an holographic relief pattern on a surface thereof, and a coating upon said substrate surface, said coating being essentially transparent, and having a thickness of said relief pattern so as to entirely fill said relief pattern and having a refractive index different from the refractive index of said substrate.

2. The information storage media recited in claim 1 wherein said coating is between 0.1–1 mil thick and has a refractive index which is at least 0.1 unit from the refractive index of said substrate.

3. The information storage media recited in claim 2 wherein said substrate is a flexible polyvinyl tape and said coating is a flexible coating.

4. The information storage media recited in claim 2 wherein said substrate is a non-flexible material and said coating is an inorganic compound.

References Cited

UNITED STATES PATENTS

| | | | |
|---|---|---|---|
| 3,109,749 | 11/1963 | DiRicco | 117—239 |
| 3,551,202 | 12/1970 | Wright et al. | 117—239 |
| 3,490,946 | 1/1970 | Wolff | 117—239 X |
| 2,608,127 | 8/1952 | Redfield | 96—50 |
| 2,245,218 | 6/1941 | Murray et al. | 96—67 X |
| 1,548,951 | 8/1925 | Malone | 96—50 X |
| 3,591,379 | 7/1971 | Plakunov | 96—67 |
| 2,173,480 | 9/1939 | Jung | 96—50 |
| 1,702,663 | 2/1929 | Motter | 117—8.5 |
| 3,355,308 | 11/1967 | Walkup | 117—9 |
| 2,128,390 | 8/1938 | Zerilli | 117—8 |
| 3,158,494 | 11/1964 | Eikum et al. | 117—45 |
| 3,097,106 | 7/1963 | Blout et al. | 117—138.8 X |

OTHER REFERENCES

Bartolini et al.: Holography, Applied Optics, vol. 9, No. 10, October 1970, pp. 2283–2290.

Whitney: Protective Coating for Magnetic Recording Surfaces, IBM Technical Disclosure Bulletin, vol. 7, No. 1, June 1964, pp. 3 and 4.

Phipps et al.: Stabilizing Film for Magnetic Materials, IBM Technical Disclosure Bulletin, vol. 14, No. 3, August 1971, p. 927.

MURRAY KATZ, Primary Examiner

S. L. CHILDS, Assistant Examiner

U.S. Cl. X.R.

96—27 H, 35; 117—11; 350—3.5